United States Patent [19]

DeVries et al.

[11] 4,021,591

[45] May 3, 1977

[54] SUBLIMATION TRANSFER AND METHOD

[75] Inventors: Roy F. DeVries, Oakland, N.J.; William H. Snyder, II, Staten Island, N.Y.

[73] Assignee: Roy F. DeVries, Oakland, N.J.

[22] Filed: Dec. 4, 1974

[21] Appl. No.: 529,449

[52] U.S. Cl. .................... 428/200; 8/2.5 A; 101/470; 101/473; 156/230; 156/240; 428/202; 428/323; 428/325; 428/334; 428/335; 428/336; 428/488; 428/914; 427/146; 427/148; 427/410; 427/411; 427/412

[51] Int. Cl.² .................... B32B 7/12; D06P 3/60

[58] Field of Search ............... 161/165, 406, 406 T, 161/413, 249, 216, 208; 117/3.2, 1.5, 38, 76 P, 148; 101/470, 473; 8/25 A; 156/230, 240, 277; 428/325, 914, 323, 202, 488, 200, 199, 206, 207, 334–336; 427/410–412, 146, 148

[56] References Cited

UNITED STATES PATENTS

| | | | |
|---|---|---|---|
| 2,721,821 | 10/1955 | Hoover | 161/406 |
| 2,920,009 | 1/1960 | Humphner | 161/406 |
| 3,067,054 | 12/1962 | Reese | 428/914 |
| 3,359,127 | 12/1967 | Meyer | 161/406 |
| 3,403,045 | 9/1968 | Erickson | 161/250 |
| 3,567,571 | 3/1971 | Martinovich | 428/200 |
| 3,574,049 | 4/1971 | Sander | 156/230 |
| 3,647,503 | 3/1972 | Mizutani | 161/406 |
| 3,813,218 | 5/1974 | Plasse | 8/2.5 |
| 3,860,388 | 1/1975 | Haigh | 161/406 |
| 3,952,131 | 4/1976 | Sideman | 428/334 |
| R27,892 | 1/1974 | Blake | 101/470 |

FOREIGN PATENTS OR APPLICATIONS

| | | | |
|---|---|---|---|
| 578,197 | 6/1946 | United Kingdom | 427/148 |
| 1,342,304 | 1/1974 | United Kingdom | 8/2.5 |

*Primary Examiner*—Ellis P. Robinson
*Attorney, Agent, or Firm*—Lerner, David, Littenberg & Samuel

[57] ABSTRACT

A dry release sublimation transfer is provided which includes a temporary backing sheet having disposed thereon a sublimation transfer design layer formed of one or more sublimation transfer inks, and a polymeric coating disposed in contact with such design layer. In one embodiment, the design layer is first printed on the backing sheet employing conventional printing techniques and thereafter the polymeric coating is applied over the design layer. In another embodiment, the polymeric coating is first applied to the backing sheet and thereafter the design layer is printed over the polymeric coating. The dry release sublimation transfer is applied under heat and pressure to a substrate to be decorated, such as cotton fabric or a cotton-polyester fabric, thereby causing the polymeric coating to soften and penetrate into the substrate and upon cooling securely bond the design layer to the substrate. In addition, a method for decorating a substrate employing the above-described dry release sublimation transfer is provided.

30 Claims, 3 Drawing Figures

SUBLIMATION TRANSFER AND METHOD

FIELD OF THE INVENTION

The present invention relates to a dry release sublimation transfer particularly suitable for decorating substrates such as cotton and cotton-polyester fabrics, and to a method of decorating substrates employing the dry release sublimation transfer, in a simple efficient manner.

BACKGROUND OF THE INVENTION

Sublimation printing techniques have been employed in the decoration of cloth or fabrics and involve the printing of a design on a paper backing sheet by conventional printing techniques employing sublimation inks, and then transferring such design under heat and pressure to the cloth or fabric. The decorating of 100% polyester fabrics and garments, such as 100% polyester T-shirts, employing such techniques has enjoyed overwhelming success. The sublimation inks, although somewhat dull and off-colored when printed on the paper backing sheet, have been found to produce brilliant colors and clear designs when transferred under heat and pressure to such 100% polyester fabrics or garments.

When it has been attempted to transfer designs comprising sublimation inks to 100% cotton fabrics or fabrics formed of cotton-polyester combinations, it has been found that the sublimation designs on such fabrics are distorted and the colors thereof are faded. It is theorized that the difficulties encountered in attempting to decorate fabrics containing cotton is attributed to the high porosity of cotton which causes the cotton to absorb unduly large amounts of the sublimation dyes.

Various techniques have been suggested in an effort to overcome the problems associated with the decoration of fabrics containing cotton. One technique involves the impregnation of such fabrics with an aqueous solution of an emulsion polymer, and drying the so-impregnated fabric and then transferring a sublimation ink design layer from a paper backing, under heat and pressure, to the so-impregnated fabric. Another technique attempted involves the spray coating of the fabric with a diluted emulsion polymer and thereafter transferring a sublimation ink design layer from a paper backing, under heat and pressure, to the dried, so-spray-coated fabric.

Unfortunately, it has been found that the above techniques have, for the most part, been unsatisfactory in that the colors of the transferred design become faded after relatively short periods of time, probably due to migration of the sublimation inks into the cotton portion of the fabric. Furthermore, these prior art techniques require at least two separate steps in effecting the design transfer to the fabric, namely, application of the emulsion polymer to the fabric in a first step, and transferring the sublimation design to the treated fabric in a second step. The requirement of these two separate steps, especially the application of the emulsion polymer to the fabric, makes it practically mandatory that the fabrics be decorated by professionals in a commercial facility so that the emulsion polymer can be applied in the necessary amount and consistency. Moreover, the more attractive marketing approach would be to have the consumer or layman separately purchase the fabric or garment, and the sublimation transfer, and decorate the fabric or garment at home employing a conventional iron as a source of the required heat and pressure to effect the transfer.

BRIEF STATEMENT OF THE INVENTION

In accordance with the present invention, there is provided a dry release sublimation transfer which may be simply and efficiently applied to a substrate, including cotton fabrics, and cotton-polyester fabrics, in a one-step operation to provide a sublimation design of excellent clarity, the colors of which are brilliant and distinct and remain so even after relatively long periods of time and after being subjected to a substantial number of washings. Furthermore, the dry release transfer of the invention can be easily applied by the laymen, at home, employing a conventional home iron to decorate T-shirts, sweatshirts and similar garments made of cotton or cotton-polyester mixtures.

Thus, in accordance with the present invention, there is provided a dry release sublimation transfer including a temporary backing sheet, the temporary backing sheet having deposited thereon a sublimation transfer design layer formed of one or more sublimation transfer inks, and a polymeric coating disposed in contact with the design layer. The so-formed sublimation transfer is applied to a substrate to be decorated, such as a cotton fabric or a cotton-polyester fabric, under heat and pressure with the backing sheet up so that either the polymeric coating or the design layer, depending upon the specific embodiment employed, contacts the substrate. Application of heat and pressure to the sublimation transfer causes the polymeric coating to soften and penetrate into the substrate while causing the sublimation transfer inks in the design layer to vaporize and be deposited on the substrate and be retained in and on the substrate by the polymeric coating. Upon cooling of the substrate and the design layer and polymeric coating, the polymeric coating securely bonds the design layer to the substrate.

In a preferred embodiment of the dry release sublimation transfer of the invention, the temporary backing sheet includes a release coating and the sublimation transfer design layer is deposited on the release coating and thereafter the polymeric coating is deposited on the design layer. Thus, when employing the preferred sublimation transfer for decorating a substrate, the sublimation transfer will be positioned on the substrate with the polymeric coating forming a layer between the substrate and the sublimation transfer design layer.

In yet another embodiment of the dry release sublimation transfer of the invention, the temporary backing sheet includes a release coating to facilitate release of the polymeric coating and design layer therefrom and the polymeric coating is first deposited on the release coating and thereafter the design layer is deposited on the polymeric coating. In such embodiment, when the dry release sublimation transfer is employed for decorating a substrate, the sublimation transfer will be positioned on the substrate so that the design layer thereof contacts the substrate.

In still another embodiment of the dry release sublimation transfer of the invention, the temporary backing sheet, which preferably includes a release coating thereon, includes a first polymeric coating layer deposited on the release layer, a sublimation design layer deposited on the first polymeric coating layer, and a second polymeric coating layer deposited on the design layer.

With respect to each of the above embodiments of the dry release sublimation transfer of the invention, the sublimation transfer design layer is preferably printed or laid down on the release coating of the temporary backing sheet by offset printing or silk screening, the latter method being employed when there are only a relatively small number of different sublimation ink colors in the design layer, and the polymeric coating is printed or laid down on the design layer or the release layer of the temporary backing sheet, depending upon the particular configuration of the final dry release sublimation transfer, by silk screening.

Further, in accordance with the present invention, a method for decorating a substrate, such as a cotton fabric or a cotton-polyester fabric with a design comprising one or more sublimation inks is provided, which method includes the steps of providing a dry release sublimation transfer comprising any of the various embodiments thereof described above, positioning the dry release sublimation transfer on a substrate to be decorated with the temporary backing sheet disposed away from the substrate, and applying heat and pressure to the dry release sublimation transfer, thereby causing the polymeric coating to soften and penetrate into the substrate, while releasing the temporary backing sheet from the design layer. Thereafter, the design layer and polymeric coating and substrate are cooled, for example, by exposure to ambient air, whereby the polymeric coating securely bonds the design layer to the substrate.

DETAILED DESCRIPTION OF THE FIGURES

Figure 1:
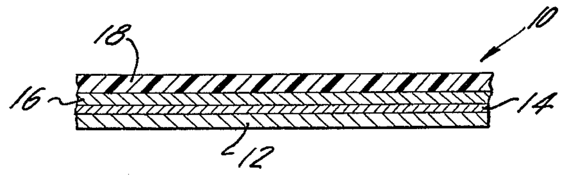
FIG. 1 is a diagrammatic cross-sectional representation of a dry release sublimation transfer in accordance with the present invention.

Referring now to the accompanying Figures, in FIG. 1, there is shown a preferred embodiment of the dry release sublimation transfer of the invention generally indicated by the numeral 10. The dry release sublimation transfer 10 includes a temporary backing sheet 12 having a release layer 14 disposed thereon. Sublimation design layer 16 is disposed over the release layer 14, release layer 14 serving as an imprint receiving support for the design layer 16. Polymeric coating layer 18 is disposed on the sublimation design layer 16.

The temporary backing sheet 12 may comprise a suitable sheet material which is relatively non-porous and substantially impervious to the release layer 14 when the latter is in softened or molten condition. For example, the temporary backing sheet 12 may comprise a paper backing sheet, preferably of the parchment type. However, other materials may be employed in place of paper, such as fiberglass cloth, plastic film, for example, polytetrafluoroethylene, cross-linked phenol-formaldehyde resin, and cross-linked urea-formaldehyde resin, or a thin metal foil or a woven or non-woven fabric, as will be apparent to one skilled in the art.

As indicated above and as shown in FIG. 1, the dry release sublimation transfer can preferably include a release layer 14 disposed on the backing sheet 12. The release layer 14 must be formed of a material which is solid at room temperature and which when heated to the temperatures normally encountered during heat release application of the dry release sublimation transfer of the invention, will soften so that the backing sheet 12 may be easily removed from the remainder of the transfer after application of the transfer to the substrate to be decorated. Thus, the release layer 14 may comprise a wax coating formed of a relatively high melting point wax of vegetable or mineral origin, e.g. vegetable wax having a melting point of from about 130° F. to about 160° F. or a mineral wax having a melting point of from about 180° F. to about 220° F. However, instead of the vegetable or mineral waxes, normally solid polyethylene glycols having a relatively high molecular weight of at least 1000 may be employed. Such materials are wax-like solids and are sold for example by Union Carbide & Carbon Chemicals Corporation under the trademark "Carbowax." Examples of such materials are Carbowax compounds 4000, 6000, and 20M. These wax-like materials can be applied in generally the same manner as ordinary wax coatings. Such normally solid polyethylene glycols have softening points in the range of from about 150° F. to about 350° F. so that they are capable of providing the desired heat release properties under a variety of practical operating conditions. Other examples of release layers suitable for use herein include low molecular weight polyethylenes, polytetrafluoroethylene as well as stearic acid.

The sublimation design layer 16 may be applied to the release layer 14 of the backing sheet 12 as one or more layers of an organic base sublimation ink or a water-soluble sublimation ink comprising a sublimation dye, such as a disperser dye, including encapsulated dyes, having a sublimation point between 100° C. and 300° C; a thickener, such as water-soluble colloids, for example, methyl cellulose, sodium carboxymethyl cellulose, carboxymethyl cellulose, or hydrophobic materials such as polyvinyl acetate, polyvinyl chloride, polyketone resins and the like; and sodium alginates; and water. The amount of dye employed is determined by the required depth of shade. Examples of sublimation inks suitable for use herein are set out in French Pat. No. 1,223,330, the disclosure of which is incorporated herein by reference. Examples of dyes suitable for use herein include CI No. 54 Latyl 3G (yellow), CI No. 25 Latyl NST (orange), CI No. 1 Acetamine B (red), CI No. 28 Latyl 2R (blue) and CI No. 2 Latyl MS (brown); the letters CI referring to the trade publication entitled "Color Index," all of which dyes are available from E. I. DuPont.

Typical offset sublimation transfer inks suitable for use herein may have the following formulation:

47.9% lithographic varnishes, such as boiled linseed oil;

2.8% paste drier, such as cobalt naphthenate;

0.6% offset ink compound, such as petroleum based waxes or similar materials to give good dispersion and release of dyes, on printing; and 46.6% microencapsulated sublimation dye. Examples of commercially available offset sublimation transfer inks include the Sinvatherm line of inks such as NW 8380 (blue), NW 6587 (magenta), NW 6586 (yellow), and NW 7814 (black) distributed by Sinclair & Valentine Co. of North Haven, Connecticut, and the Lithotex line of inks such as V-0194 (blue), V-5044 (magenta), V-5008 (yellow), and V-0245 (black) distributed by Colonial Inc., Co., of East Rutherford, New Jersey.

In applying the sublimation design layer 16 to the release layer 14, any conventional printing techniques may be employed, such as offset printing, lithographic or silk screening techniques, the latter technique being employed when the design layer is formed of relatively small number of different colors. Normally, the sublimation design layer 16 will be deposited on release layer 14 so that it has a thickness within the range of from about 0.1 to about 3 mils, so that the sublimation design layer 16 will have sufficient depth so that it may be transferred to a substrate, such as cotton fabric or cotton-polyester fabric with a portion of the design layer penetrating into the pores of the fabric while a portion of such design layer remains on the surface of the fabric. Where the sublimation design layer 16 is substantially greater than 3 mils, it has been found that when the sublimation design is transferred to the above-mentioned substrates, an unduly thick design layer is deposited on the surface of the substrate causing such surface to be undesirably coarse and suseceptible to cracking or peeling especially after being washed in a washing machine.

The polymeric coating layer 18 may be formed of a polymeric material which upon being subjected to heat and pressure as described below will soften and adhere to the substrate to be decorated. Furthermore, the polymeric coating layer 18 must be capable of transferring the sublimation design layer 16 from the release layer 14 to the substrate. Upon cooling of the polymeric coating layer 18 and the sublimation design layer 16, deposited on the substrate, the polymeric coating will harden and bond the sublimation design to the substrate. Where the substrate to be decorated is a porous material such as a fabric or garment, for example, T-shirts, napkins, other clothing and the like, the polymeric material upon application of heat and pressure thereto should preferably penetrate into the pores of the substrate carrying with it at least a portion of the sublimation design.

The final properties of such porous material, such as hand or feel, will depend on the glass temperature and the molecular weight of the polymeric material employed. Thus, for example, where it is desired that the decorated substrate in the form of a fabric or garment have a relatively soft leathery hand, the polymeric material employed should have a glass temperature within the range of from about −20° C. to about 10° C. and a molecular weight within the range of from about 20,000 to about 75,000 so that it is capable of being softened upon application of a desired amount of heat and pressure thereto and thus will penetrate into the pores of the substrate carrying with it at least a portion of the sublimation design.

Where it is desired to decorate a relatively porous substrate, such as a fabric or garment, where the hand or feel thereof may be relatively stiff or hard, such as in the case of T-shirts, dresses, ties, suits, sports uniforms, fabrics such as linen, and the like, or a relatively non-porous substrate, such as a hard plastic, for example, in the form of a placemat, or Masonite, wood or metallic substrate, the polymeric material employed need not substantially penetrate into the substrate and may have a glass temperature within the range of from about 10° C. to 50° C. or higher and a molecular weight within the range of from about 80,000 to about 500,000 or higher. In such case, the polymeric material and sublimation design will be deposited primarily on an external surface of the substrate to produce a design of high brilliance, clarity and sharpness.

Where the polymeric material has a glass temperature of less than about −20° C., for example from about −75° C to about −20° C., it has been found that it will produce a sticky or tacky feel to the substrate. Accordingly, for most applications, the polymeric material should have a glass temperature of at least about −20° C. or higher as indicated above.

Depending upon the type of substrate to be decorated, in accordance with the invention, the polymeric coating should be applied in an amount to produce a layer 18 having a thickness within the range of from about 0.1 to about 20 mils and preferably from about 0.2 to about 10 mils.

The polymeric material suitable for use herein may comprise homopolymers, copolymers, or terpolymers having the above-mentioned glass temperature and molecular weights such as acrylic polymers, styrene polymers, vinyl polymers, and copolymers and terpolymers thereof including copolymers of butyl acrylate and methyl acrylate, acrylonitrite-butadiene-styrene terpolymers, copolymers of vinyl isobutyl ether and methyl methacrylate, copolymers of ethyl acrylate and methyl or butyl methacrylate, copolymers of vinyl acetate and butyl acrylate, methyl acrylate polymers, copolymers of vinyl chloride and ethylene, copolymers of butyl acrylate and methyl methacrylate, copolymers of butyl acrylate and butyl methacrylate, copolymers of ethylene and vinyl acetate, copolymers of styrene and 1,3,-butadiene, copolymers of vinyl isobutyl ether and methyl methacrylate. Other polymers suitable for use herein include poly n-butyl methacrylate, polyvinyl acetate, poly n-propyl methacrylate, polyethyl methacrylate, polyvinyl chloride, polyacrylonitrile, polystyrene, polymethyl methacrylate, polyethyl acrylate, poly n-propyl acrylate, poly n-butyl acrylate, and polyisobutylene.

A list of polymers suitable for use herein and their glass temperature is set out below in Table I.

TABLE I

Variation in Glass Transition Temperature ($T_g$) for Useful Polymers, Copolymers and Terpolymers.

| Polymer, Copolymer or Terpolymer % by Weight | $T_g$ (° C) |
|---|---|
| Methyl methacrylate | 105 |
| Styrene | 100 |
| Acrylonitrile | 94 |
| Vinyl chloride | 79 |
| 20% vinyl isobutyl ether-80% methyl methacrylate | 71 |
| 20% ethyl acrylate-80% methyl methacrylate | 70 |
| Ethyl methacrylate | 65 |
| 20% butyl acrylate-80% methyl methacrylate | 57 |
| 40% vinyl isobutyl ether-60% methyl methacrylate | 42 |
| 40% ethyl acrylate-60% methyl methacrylate | 41 |
| 80% styrene-20% butadiene-1,3 | 41 |
| n-Propyl methacrylate | 33 |
| Vinyl acetate | 28 |
| n-Butyl methacrylate | 20 |
| 40% butyl acrylate-60% methyl methacrylate | 20 |
| 40% styrene-30% 1,3-butadiene-30% acrylonitrile | 19 |
| 60% vinyl isobutyl ether-40% methyl methacrylate | 16 |
| 60% ethyl acrylate-40% methyl methacrylate | 15 |
| 20% ethyl acrylate-80% butyl methacrylate | 10 |
| 80% vinyl acetate-20% butyl acrylate | 9 |
| Methyl acrylate | 8 |
| 80% vinyl chloride-20% ethylene | 5 |
| 50% butyl acrylate-50% methyl methacrylate | 4 |
| 40% ethyl acrylate-60% butyl methacrylate | 2 |
| 20% butyl acrylate-80% butyl methacrylate | 2 |
| 20% ethylene-90% vinyl acetate | 1 |
| 30% styrene-40% 1,3-butadiene-30% acrlonitrile | 0 |
| 60% styrene-40% 1,3-butadiene | 0 |
| 80% vinyl isobutyl ether-20% methyl methacrylate | −2 |
| 80% ethyl acrylate-20% methyl methacrylate | −3 |

TABLE I-continued

| Variation in Glass Transition Temperature ($T_g$) for Useful Polymers, Copolymers and Terpolymers. | |
|---|---|
| Polymer, Copolymer or Terpolymer % by Weight | $T_g$ (° C) |
| 60% ethyl acrylate-40% butyl methacrylate | −7 |
| 60% butyl acrylate-40% methyl methacrylate | −10 |
| 60% vinyl acetate-40% butyl acrylate | −11 |
| 80% ethyl acrylate-20% butyl methacrylate | −14 |
| 40% butyl acrylate-60% butyl methacrylate | −15 |
| 20% styrene-50% 1,3-butadiene-30% acrylonitrile | −17 |
| Ethyl acrylate | −22 |
| 20% ethylene-80% vinyl acetate | −22 |
| 40% vinyl acetate-60% butyl acrylate | −27 |
| 60% butyl acrylate-40% butyl methacrylate | −28 |
| 40% styrene-60% 1,3-butadiene | −32 |
| 80% butyl acrylate-20% methyl methacrylate | −35 |
| 20% vinyl acetate-80% butyl acrylate | −42 |
| 80% butyl acrylate-20% butyl methacrylate | −43 |
| 30% ethylene-70% vinyl acetate | −43 |
| n-Propyl acrylate | −51 |
| n-Butyl acrylate | −54 |
| 40% ethylene-60% vinyl acetate | −60 |
| Isobutylene | −74 |

The polymers may be employed in substantially any known form. However, for sake of convenience, it is preferred that the polymer be applied in the form of a liquid, such as a solution polymer, emulsion polymer or suspension polymer. In the case of the dry release sublimation transfer shown in FIG. 1, it is preferred that emulsion polymers be employed to insure that the sublimation inks employed will be insoluble in the emulsion polymer. Examples of emulsion polymers suitable for use herein comprise Elvace 1875 (DuPont's trademark for ethylene-vinyl acetate copolymer) containing 55% by weight solids having a glass temperature of about 5° C., Polyco P-571 (Borden Chemical Company's trademark for polyvinyl acetate) containing 55% by weight solids having a glass temperature of about 29° C., polymethylacrylate (18.6% by weight) emulsified with sodium lauryl sulfate or polyethylene oxide and having a glass temperature of about 8° C., and Rhoplex K-87 (Rohm & Haas trademark for acrylic polymers) containing 46% by weight solids and having a glass temperature of about −18° C. The preferred emulsion polymers are emulsion copolymers of ethylene and vinyl acetate, and acrylic emulsion polymers.

Figure 2:
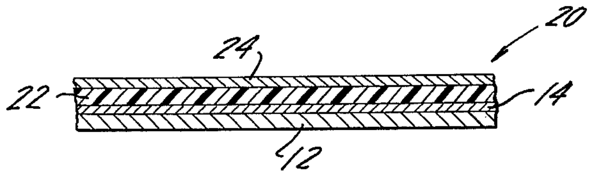
FIG. 2 is a diagrammatic cross-sectional representation of another embodiment of the dry release sublimation transfer of the invention.

Referring now to FIG. 2, there is shown another embodiment of the dry release sublimation transfer of the invention generally indicated by the numeral 20. The dry release sublimation transfer 20 includes a temporary backing sheet 12 having a release layer 14 disposed thereon. Polymeric coating layer 22 is disposed over the release layer 14, and sublimation design layer 24 is disposed on the polymeric coating 22. Thus, it will be seen that in applying the dry release sublimation transfer 22 to a substrate, the sublimation design layer 24 directly contacts the substrate. However, in the case of the dry release sublimation transfer 10 shown in FIG. 1, the transfer 10 is applied to a substrate so that the polymeric coating layer 18 initially contacts the substrate.

In the dry release sublimation transfer 20 shown in FIG. 2 the backing sheet 12, release layer 14, and sublimation design layer 24 are all as described with reference to the transfer embodiment shown in FIG. 1. However, the polymeric coating layer 22 may comprise any of the polymeric materials mentioned above with respect to the FIG. 1 embodiment. Thus, either emulsion polymers or solution polymers may be employed in forming the polymeric coating layer 22. Examples of emulsion polymers as well as other types of polymers suitable for use for forming the layer 22 are set out above with respect to FIG. 1.

In applying the polymeric coating layer 22 to the release layer, sufficient polymer is applied so that a polymer thickness of about 0.2 to about 5 mils is present to insure that the polymeric coating will adhere to the release layer and backing sheet.

In the case where solution polymers are employed for forming the polymeric layer 22, solution polymers suitable for use should have a viscosity in the range of from about 500 to about 2000 or more centipoises and a solids content ranging from about 20 to about 60% by weight so as to avoid undue penetration of the polymeric coating in the substrate to be decorated. Examples of solution polymers suitable for use herein include the following: polyethyl acrylate (36.2% by weight) in benzene having a glass temperature of −22° C., polymethyl acrylate (22.3% by weight) in chloroform having a glass temperature of 8° C., polypropyl acrylate (36.2% by weight) in benzene having a glass temperature of −54° C., poly (50% butyl acrylate - 40% butyl methacrylate) (30.8% by weight) in chloroform, poly (85% ethyl acrylate -15% butyl methacrylate) (26.1% by weight) in chloroform, poly (80% butyl acrylate - 20% vinyl acetate) (31.2% by weight) in chloroform, poly (90% butyl acrylate - 10% methyl methacrylate) (29.5% by weight) in chloroform, poly (80% butyl acrylate - 20% butyl methacrylate) (30.3% by weight) in chloroform, and polybutyl methacrylate being preferred.

Figure 3:
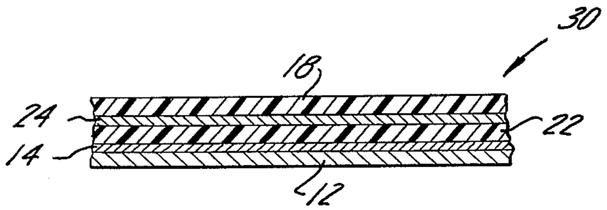
FIG. 3 is a diagrammatic cross-sectional representation of still another embodiment of the dry release sublimation transfer of the invention.

In FIG. 3, there is shown yet another embodiment of the dry release sublimation transfer of the invention which is generally designated by the numeral 30. The dry release sublimation transfer 30 includes a temporary backing sheet 12 having disposed thereon a release layer 14. A first polymeric coating layer 22 is disposed on the release layer and functions as a base for sublimation design layer 24. A second polymeric coating layer 18 is disposed on the sublimation design layer 24 so that the sublimation design layer 24 is, in effect, sandwiched between the first and second polymeric coating layers 22 and 18, respectively. As in the case of FIG. 2, the first polymeric coating layer 22 which functions as a base for the sublimation design layer 24 may comprise any of the polymeric materials set out above including either emulsion polymers or solution polymers. However, the second polymeric coating 18 will preferably comprise an emulsion polymer and not a solution polymer.

It will also be appreciated that the polymeric coating materials employed herein may include from about 2 to about 25% by weight and preferably from about 5 to about 15% by weight of an opacifying agent, such as titanium dioxide, calcium carbonate, calcium fluoricde, kaolin, talcum, and the like, where it is designed to decorate a colored substrate.

The polymeric coating materials may also include one or more suitable conventional plasticizers in an amount ranging from about 2 to about 10% by weight to impart increased flexibility thereto as well as lower the glass temperature thereof. Examples of plasticizers suitable for use herein include dioctyl phthalate, tricresyl phosphate, chlorinated biphenyl, dibutyl sebacate, dibutyl phthalate, dimethyl phthalate, and glycerol.

In employing the dry release sublimation transfer 10, 20 or 30 as shown in FIGS. 1, 2, and 3, respectively, to decorate a substrate material, the transfer is applied so that either a polymeric coating in the case of the tranfer of FIGS. 1 and 3 or the sublimation design layer itself in the case of FIG. 2 directly contacts the substrate so that the backing sheet upwardly away from the substrate. Thereafter, heat and pressure are applied to the backing sheet, such as by employing a conventional iron or press or even a vacuum press, whereby the dry release sublimation transfer is heated to a temperature within the range of from about 200° to about 450° F, and preferably from about 350° to about 425° F, under a pressure within the range ofr from about 2 to about 100 psig, and preferably from about 4 to about 50 psig, for a time ranging from about 7 to about 80 seconds and preferably from about 20 to about 40 seconds. At this time, the backing sheet 12 is released from the remainder of the transfer leaving the sublimation design layer and polymeric coating layer adhered to the substrate to be decorated. Thereafter, the substrate including the polymeric coating and sublimation design layer are allowed to cool, for example, by blowing ambient air over the same. Upon cooling, the polymeric coating layer tightly bonds the sublimation design to the substrate.

The substrate will thereby be decorated with the sublimation design, which design will be sharp and clear and be composed of bright, pleasing colors. In fact, the transferred design will be substantially brighter and more vivid than the design layer carried by the dry release transfer of the invention. It is believed that during the transfer process described above, the heat applied to the dry release transfer transforms the sublimation inks of the design layer (which are dull and drab in appearance) to vapors, such vapors contacting the substrate to be decorated and solidifying thereon to from a design having the desired bright colors.

Thus, it will be appreciated from the foregoing that the present invention provides a dry release sublimation transfer which includes a sublimation design layer and polymeric coating layer which layers may be transferred simultaneously to a substrate which may comprise cotton or cotton-polyester mixtures, in a simple one step technique which may be carried out at home by the layman employing a conventional iron or other means for applying heat and pressure to the transfer and substrate.

What is claimed is:

1. A dry release sublimation transfer comprising a temporary backing sheet, said backing sheet having deposited thereon a sublimation transfer design layer comprised of one or more sublimation transfer inks having a sublimation point between about 100° and 300° C., and a discrete polymeric layer disposed in contact with said design layer, said polymeric layer comprising a polymer having a glass transition temperature within the range of from about −20° C. to about 50° C., a thickness of between about 0.1 and 20 mils, and having a softening point within the transfer range of said sublimation transfer inks, said polymer being selected from the group consisting of copolymers of butyl acrylate and methyl acrylate, acrylonitrilebutadiene-styrene terpolymers, copolymer of vinyl isobutyl ether and methyl methacrylate, copolymers of ethyl acrylate and methyl methacrylate, copolymers of ethyl acrylate and butyl methacrylate, copolymers of vinyl acetate and butyl acrylate, methyl acrylate polymers, copolymers of vinyl chloride and ethylene, copolymers of butyl acrylate and methyl methacrylate, copolymers of butyl acrylate and butyl methacrylate, copolymers of ethylene and vinyl acetate, copolymers of styrene and 1,3-butadiene, copolymers of vinyl isobutyl ether and methyl methacrylate, poly n-butyl methacrylate, poly n-propyl methacrylate, polyethyl methacrylate, polyvinyl chloride, polyacrylonitrile, polystyrene, polymethyl methacrylate, polyethyl acrylate, poly n-propyl acrylate and poly n-butyl acrylate whereby upon the application of said dry release sublimation transfer under heat and pressure to a cotton-containing textile substrate to be decorated, said polymeric layer is adapted to soften and penetrate into said substrate, and said design layer is transferre to said substrate, and upon cooling securely bonds said design layer to said textile substrate.

2. The transfer as defined in claim 1 wherein said temporary backing sheet includes a release coating to facilitate release of said design layer and polymeric layer from said temporary backing sheet upon application of heat thereto.

3. The transfer as defined in claim 1 wherein said polymeric layer is deposited on said sublimation design layer.

4. The transfer as defined in claim 1 wherein said polymeric layer includes an opacifying agent, said opacifying agent being present in an amount of between about 2 and 25% of said polymeric layer.

5. The transfer as defined in claim 1 wherein said polymer has a molecular weight within the range of from about 20,000 to about 500,000.

6. The transfer as defined in claim 3 wherein said sublimation transfer inks forming said design layer are substantially insoluble in said polymeric coating at room temperatures.

7. The transfer as defined in claim 6 wherein said polymeric layer is prepared from an emulsion polymer.

8. The transfer as defined in claim 7 wherein said emulsion polymer comprises an ethylene-vinyl acetate copolymer.

9. The transfer as defined in claim 1 wherein said polymeric layer is disposed between said temporary backing sheet and said sublimation transfer design layer.

10. The transfer as defined in claim 9 wherein said polymeric layer is prepared from a polymer selected from the group consisting of an emulsion polymer and an solution polymer.

11. The transfer as defined in claim 10 wherein said solution polymer is a solution polymer of a member selected from the group consisting of methacrylate polymers, ethyl acrylate polymers, copolymers of butyl acrylate and ethyl acrylate, propyl acrylate polymers, butyl acrylate polymers, copolymers of butyl acrylate and butyl methacrylate, copolymers of butyl acrylate and vinyl acetate, and copolymers of butyl acrylate and methyl methacrylate.

12. The transfer as defined in claim 10 wherein said emulsion polymer is an emulsion polymer of a member selected from the group consisting of acrylic polymers, methacrylate polymers, vinyl acetate polymers, copolymers of ethylene and vinyl acetate, and copolymers of vinyl acetate and alkyl acrylates.

13. A method for decorating a textile substrate with a design comprising one or more sublimation inks having a sublimation point between about 100° and 300° C., which method includes the steps of providing a dry release sublimation transfer comprising a temporary backing sheet, said backing sheet having deposited thereon a sublimation transfer design layer comprised of one or more sublimation inks having a sublimation point between about 100° and 300° C., and a discrete polymeric layer disposed in contact with said design layer, said polymeric layer having a glass transition temperature within the range of from about −75° C. to about 50° C., a softening point within the transfer range of said sublimation inks, and a thickness of between about 0.1 and 20 mils, positioning said dry release sublimation transfer on a textile substrate to be decorated with said temporary backing sheet disposed away from said textile substrate, heating said dry release sublimation transfer to a temperature of from about 200 to about 450° F., and a pressure of from about 2 to about 100 psig, thereby causing said design layer to be transferred to said textile substrate and said polymeric layer to soften and penetrate into said textile substrate, while releasing said temporary backing sheet from said design layer, and cooling said design layer and polymeric layer wherein said polymeric layer securely bonds said design layer to said textile substrate.

14. The method as defined in claim 13 wherein said temporary backing sheet includes a release coating to facilitate release of said design layer and polymeric layer from said temporary backing sheet upon application of heat thereto.

15. The method as defined in claim 13 wherein said polymeric layer is a layer of a polymer selected from the group consisting of copolymers of butyl acrylate and methyl acrylate, acrylonitrile-butadiene-styrene terpolymers, copolymers of vinyl isobutyl ether and methyl methacrylate, copolymers of ethyl acrylate and methyl methacrylate, copolymers of ethyl acrylate and butyl methacrylate, copolymers of vinyl acetate and butyl acrylate, methyl acrylate polymers, copolymers of vinyl chloride and ethylene, copolymers of butyl acrylate and methyl methacrylate, copolymers of butyl acrylate and butyl methacrylate, copolymers of ethylene and vinyl acetate, copolymers of styrene and 1,3,-butadiene, copolymers of vinyl isobutyl ether and methyl methacrylate, poly n-butyl methacrylate, polyvinyl acetate, poly n-propyl methacrylate, polyethyl methacrylate, polyvinyl chloride, polyacrylonitrile, polystyrene, polymethyl methacrylate, polyethyl acrylate, poly n-propyl acrylate, poly n-butyl acrylate, and polyisobutylene.

16. The method as defined in claim 11 wherein said polymer has a molecular weight within the range of from about 20,000 to about 500,000.

17. The method as defined in claim 16 wherein said polymer has a glass temperature within the range of from about −20° C to about 10° C, and a molecular weight within the range of from about 20,000 to about 75,000.

18. The method as defined in claim 13 wherein said polymeric layer is deposited on said sublimation design layer.

19. The method as defined in claim 14 wherein said sublimation transfer inks forming said design layer is substantially insoluble in said polymeric layer.

20. The method as defined in claim 19 wherein said polymeric layer is prepared from an emulsion polymer.

21. The method as defined in claim 20 wherein said emulsion polymer comprises an emulsion polymer of a member selected from the group consisting of acrylic polymers, methacrylate polymers, vinyl acetate polymers, copolymers of ethylene and vinyl acetate, and copolymers of vinyl acetate and alkyl acrylates.

22. The method as defined in claim 21 wherein said emulsion polymer comprises an acrylic polymer or copolymer.

23. The method as defined in claim 21 wherein said emulsion polymer comprises an ethylene-vinyl acetate copolymer.

24. The method as defined in claim 13 wherein said polymeric coating is disposed between said temporary backing sheet and said sublimation transfer design layer.

25. The method as defined in claim 24 wherein said polymeric layer is prepared from a polymer selected from the group consisting of an emulsion polymer and a solution polymer.

26. The method as defined in claim 25 wherein said solution polymer is a solution polymer of a member selected from the group consisting of methacrylate polymers, ethyl acrylate polymers, copolymers of butyl acrylate and ethyl acrylate, propyl acrylate polymers, butyl acrylate polymers, copolymers of butyl acrylate and butyl methacrylate, copolymers of butyl acrylate and vinyl acetate, and copolymers of butyl acrylate and methyl methacrylate.

27. The method as defined in claim 25 wherein said emulsion polymer is an emulsion polymer of a member selected from the group consisting of acrylic polymers, methacrylate polymers, vinyl acetate polymers, copolymers of ethylene and vinyl acetate, and copolymers of vinyl acetate and alkyl acrylates.

28. The method as defined in claim 13 wherein said polymeric layer includes an opacifying agent, said opacifying agent being present in an amount of between 2 and 25% of said polymeric layer.

29. The method as defined in claim 13 wherein said textile substrate comprises cotton fabric and treated cotton fabrics.

30. The method as defined in claim 13 wherein said textile substrate comprises a fabric formed of a cotton-polyester mixture.

* * * * *

UNITED STATES PATENT OFFICE
CERTIFICATE OF CORRECTION

Patent No. 4,021,591 Dated May 3, 1977

Inventor(s) ROY F. De VRIES and WILLIAM H. SNYDER, II

It is certified that error appears in the above-identified patent and that said Letters Patent are hereby corrected as shown below:

Column 9, Line 5, after "sheet" insert: -- faces -- .

Column 9, Line 12, delete "ofr" and insert therefor: -- of -- .

Column 9, Line 36, delete "from" and insert therefor: -- form -- .

Column 10, Line 13, delete "transferre" and insert therefor: -- transferred -- .

Column 10, Line 17, delete "coating" and insert therefor: -- layer -- .

Column 10, Line 33, delete "coating" and insert therefor: -- layer -- .

Signed and Sealed this

*thirtieth* Day of *August 1977*

[SEAL]

*Attest:*

RUTH C. MASON
*Attesting Officer*

C. MARSHALL DANN
*Commissioner of Patents and Trademarks*